(12) United States Patent
Kusafuka et al.

(10) Patent No.: US 6,735,166 B1
(45) Date of Patent: May 11, 2004

(54) OPTICAL DISK WITH PATTERN AND FABRICATION METHOD THEREOF

(75) Inventors: Takanari Kusafuka, Gifu (JP); Reiko Tazawa, Kashiwa (JP); Kenji Kiyota, Ogaki (JP); Mitsuhiro Ohtani, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 769 days.

(21) Appl. No.: 09/654,470

(22) Filed: Sep. 1, 2000

Related U.S. Application Data

(63) Continuation-in-part of application No. 09/105,234, filed on Jun. 26, 1998, now abandoned.

(30) Foreign Application Priority Data

Jul. 9, 1997 (JP) ............................................. 9-183727
Aug. 21, 1997 (JP) ............................................. 9-225121

(51) Int. Cl.⁷ ................................................. G11B 7/24
(52) U.S. Cl. ................................ 369/275.3; 369/275.4; 369/280; 428/64.4
(58) Field of Search ......................... 369/275.1, 275.3, 369/275.4, 14, 275.5, 283, 286, 274, 275.2, 277, 278, 279, 284, 285, 273, 280, 288; 428/64.1, 64.2, 64.3, 64.4

(56) References Cited

U.S. PATENT DOCUMENTS

| | | | | |
|---|---|---|---|---|
| 5,509,991 A | * | 4/1996 | Choi | 156/245 |
| 5,608,717 A | * | 3/1997 | Ito et al. | 369/275.3 |
| 5,608,718 A | * | 3/1997 | Schiewe | 369/275.4 |
| 5,675,570 A | * | 10/1997 | Ohira et al. | 369/275.1 |
| 5,729,533 A | * | 3/1998 | Marquardt | 369/273 |
| 5,751,671 A | * | 5/1998 | Koike et al. | 369/14 |
| 5,751,690 A | * | 5/1998 | Ohira et al. | 369/275.3 |
| 5,809,003 A | * | 9/1998 | Taira et al. | 369/275.1 |
| 5,858,498 A | * | 1/1999 | Ohkubo et al. | 428/64.1 |
| 5,982,737 A | * | 11/1999 | Takagishi et al. | 369/275.1 |
| 6,088,323 A | * | 7/2000 | Kobayashi et al. | 369/275.3 |

FOREIGN PATENT DOCUMENTS

| | | |
|---|---|---|
| JP | 11-31339 | 5/1989 |
| JP | 11-66631 | 6/1989 |
| JP | 08-180463 | 7/1996 |
| JP | 08-255381 | 10/1996 |
| JP | 09-091762 | 4/1997 |
| JP | 1131339 | 2/1999 |
| JP | 1166631 | 3/1999 |
| JP | JI97-0009 | 10/2002 |
| JP | JI97-0006 | 5/2003 |

* cited by examiner

*Primary Examiner*—Ali Neyzari
(74) *Attorney, Agent, or Firm*—Darby & Darby

(57) ABSTRACT

On a data recording region, an aluminum reflective film is formed together with a reflective film forming a pattern on an outer circumferential side of the data recording region. Although aluminum identical to the material of the reflective film on the data recording region can be employed for the reflective film on the outer circumferential region, gold, titanium and the like can also be used. Therefore, an optical disk that has a unique pattern formed at an outer circumferential region that was not conventionally used can be fabricated at a low cost.

19 Claims, 20 Drawing Sheets

OPTICAL DISK WITH PATTERN AND FABRICATION METHOD THEREOF

This is a continuation-in-part of Ser. No. 09/105,234 filed Jun. 26, 1998 now abandoned.

BACKGROUND OF THE INVENTION

1. Field of the Invention

The present invention relates to an optical disk and a fabrication method thereof, and more particularly to an optical disk that has a pattern at the outer periphery of a data recording region and a method of fabricating such an optical disk.

2. Description of the Background Art

Various types of optical disks are now provided such as a CD (Compact Disk), a DVD (Digital Video Disk), an MO (Magneto Optical) disk, and an LD (Laser Disk). CDs are standardized into those having a diameter of 12 cm and a diameter of 8 cm.

FIG. 1 is a plan view of a conventional CD 1 of 12 cm in diameter. Referring to FIG. 1, a center hole 2 is formed at the center of CD 1 for attachment to a drive device. A data recording region 3 of 8 cm in diameter is provided at the inner circumference of CD 1. A plurality of pits are formed at data recording region 3 according to data. Data recording region 3 is covered with a reflective film. An outer circumferential region 4 of optical disk 1 is generally colorless and transparent. Optical disk 1 is completed as a product by having a label attached on the plane opposite to the light irradiation plane.

Since a conventional optical disk 1 has an outer circumferential region 4 that is colorless and transparent as described above, it has no impact on the general consumer and is not attractive as a commercial product.

SUMMARY OF THE INVENTION

An object of the present invention is to provide an economic optical disk with a pattern and a fabrication method thereof.

According to an aspect of the present invention, an optical disk includes a transparent substrate and a reflective film. The transparent substrate has a data recording region on which data is recorded at the inner circumference. The reflective film has a first region formed on the data recording region of the transparent substrate, and a second region forming a pattern on a region at the outer circumferential side of the data recording region of the transparent substrate.

An optical disk having a pattern formed at the outer circumferential region utilizing the reflective film formed on the data recording region can be fabricated at a low cost.

According to another aspect of the present invention, an optical disk includes a transparent substrate, a first reflective film, and a second reflective film. The transparent substrate has a data recording region on which data is recorded at the inner circumference thereof. The first reflective film is formed on the data recording region of the transparent substrate. The second reflective film is formed on a region at the outer circumferential side of the data recording region of the transparent substrate, and forms a pattern. Preferably, the second reflective film has a color differing from the color of the first reflective film.

In the present aspect, an optical disk with a pattern at a transparent outer circumferential region can be fabricated at a low cost.

According to a further aspect of the present invention, a method of fabricating an optical disk including a transparent substrate having a data recording region on which data is recorded at the inner circumference thereof includes the steps of: attaching a mask on a region other than the data recording region of the transparent substrate and the region located at the outer circumferential side of the data recording region and that forms a pattern; forming a reflective film on the transparent substrate where the mask is attached; and removing the mask from the transparent substrate.

According to the above fabrication method, a reflective film that forms a pattern is provided at the outer circumferential side of the data recording region in the step of forming a reflective film on the data recording film. Therefore, an optical disk with a pattern can be fabricated at a low cost without increasing the number of fabrication steps.

According to still another aspect of the present invention, a method of fabricating an optical disk including a transparent substrate having a data recording region in which data is recorded at the inner circumference thereof includes the steps of: attaching a first mask on a region other than the data recording region of the transparent substrate; forming a first reflective film on the transparent substrate where the first mask is attached; removing the first mask from the transparent substrate, attaching a second mask on a region located at the outer circumferential side of the data recording region of the transparent substrate and excluding the region that forms a pattern; forming a second reflective film on the transparent substrate where the second mask is attached; and removing the second mask from the transparent substrate. Preferably, the second reflective film has a color differing from the color of the first reflective film.

In the above fabrication method, a reflective film forming a pattern is provided at the outer circumferential side of the data recording region in the same step of forming a reflective film on the data recording region. Therefore, an optical disk with a pattern can be fabricated at a low cost. Since the color of the reflective film forming a pattern differs from the color of the reflective film at the data recording region, a more colorful optical disk can be fabricated at a low cost.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
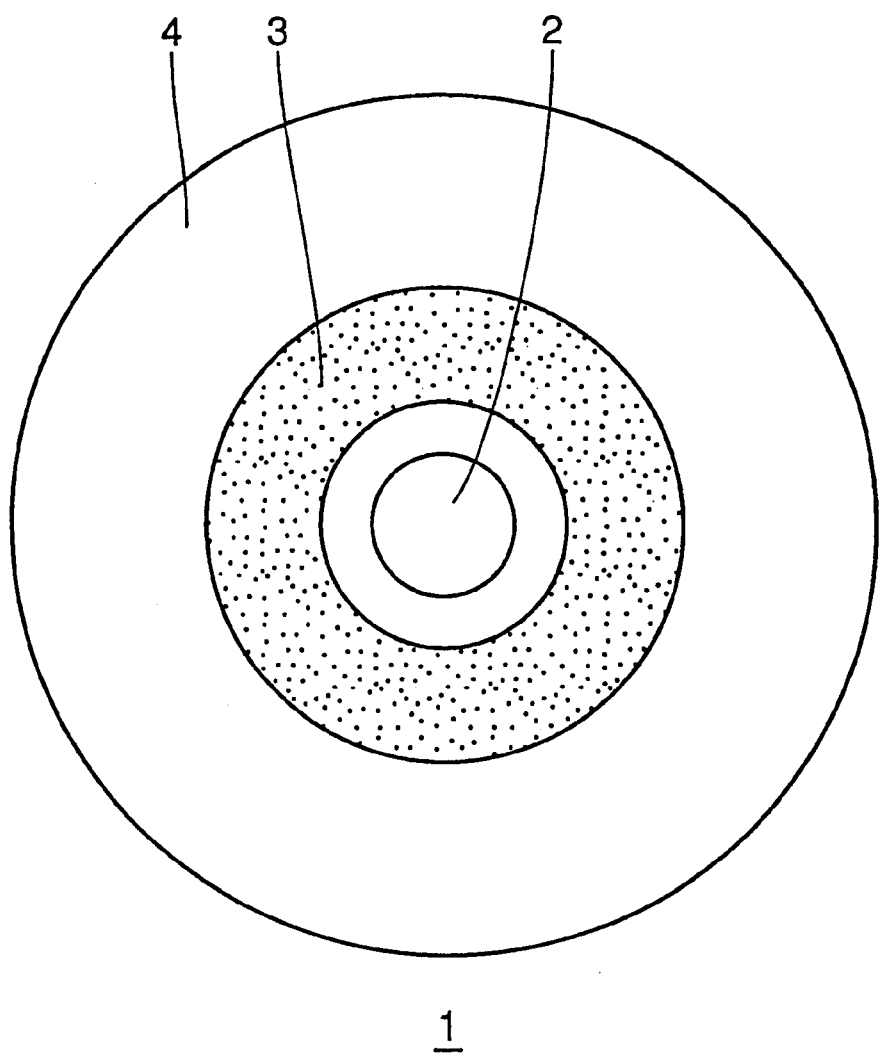
FIG. 1 is a plan view of a conventional optical disk viewed from a light incident plane.

Embodiments of the present invention will be described in detail hereinafter with reference to the drawings. In the drawings, identical or corresponding components have the same reference characters allotted, and their description will not be repeated.

First Embodiment

Figure 2:
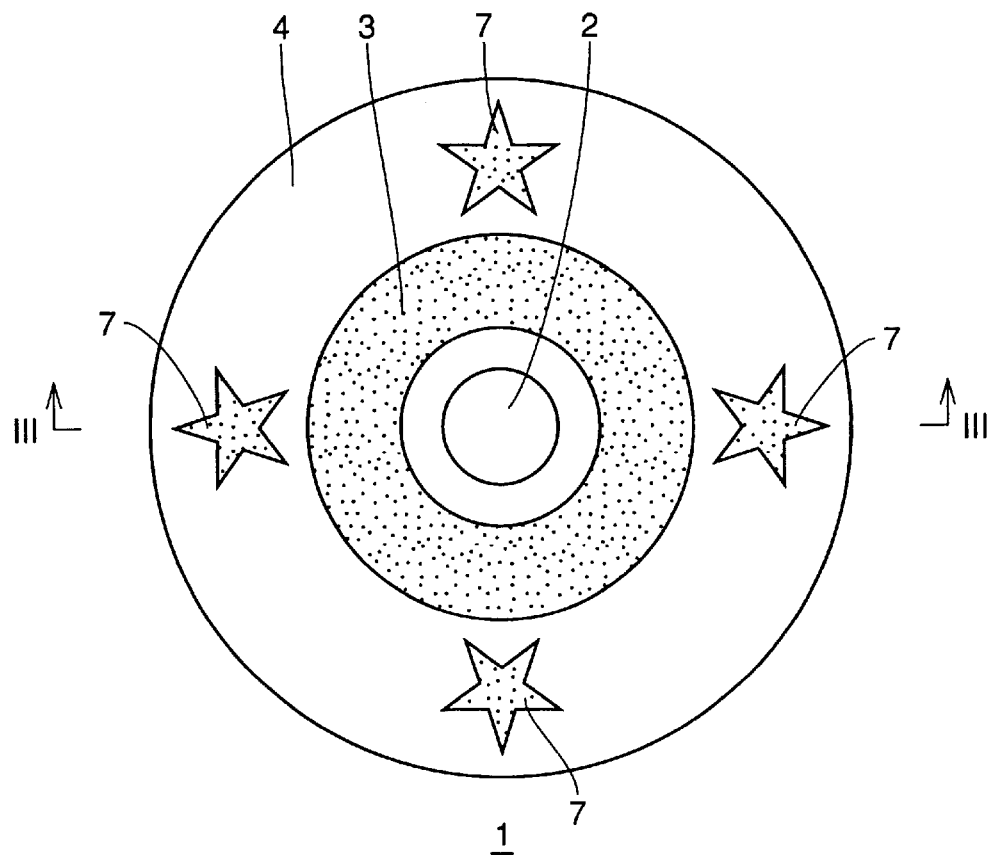
FIG. 2 is a plan view of an optical disk according to a first embodiment of the present invention viewed from a light incident plane.
Figure 3:
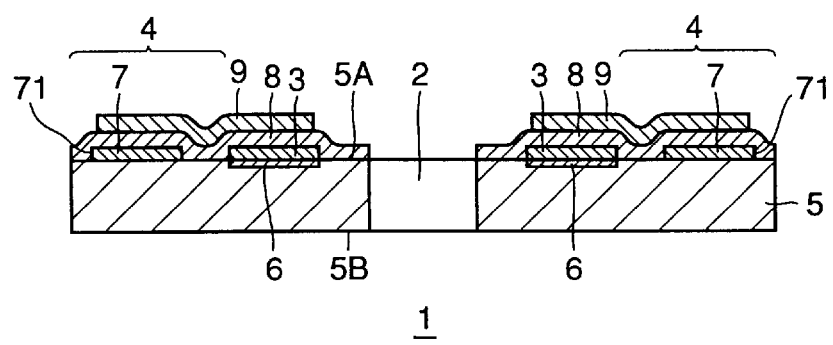
FIG. 3 is a sectional view of the optical disk of FIG. 2 taken along line III—III.

Referring to FIGS. 2 and 3, an optical disk 1 according to a first embodiment of the present invention includes a circular transparent substrate 5 formed of polycarbonate resin, glass, and the like, an annular reflective film 3 formed of aluminum, a star-shape reflective film 7 formed of aluminum, a transparent protection film 8 formed to cover the entire signal recording plane 5A opposite to a light incident plane 5B, and a label 9 attached on protection film 8.

Transparent substrate 5 includes an annular data recording region 6 at the inner circumference where data is recorded, and a center hole 2 at the center for attachment to a drive device. A plurality of pits are formed concentrically or spirally depending upon the data in data recording region 6. Reflective film 3 is formed on signal recording plane 5A of transparent substrate 5 so as to entirely cover data recording region 6. Reflective film 7 is formed on signal recording plane 5A within an outer circumferential region 4 located at the outer circumferential side of data recording region 6. Reflective film 7 forms a star-shape pattern.

Here, four reflective films 7 are formed spaced apart from reflective film 3. Since reflective films 3 and 7 are both formed of aluminum, they all have the same silver color.

Protection film 8 is formed to cover an edge 71 of reflective film 7. Since edge 71 of reflective film 7 is not exposed from the side of optical disk 1, reflective film 7 will not be corroded by the air and moisture.

Reflective film 7 is not limited to the pattern shown in FIG. 2. For example, reflective film 7 can be formed to have a character-like pattern. Another four reflective films of a crescent-shape pattern can be inserted between the four star-shape reflective films 7. Reflective film 7 can form various patterns according to the application of the optical disk.

A method of fabricating the above optical disk 1 will be described with reference to FIGS. 4A–4D and 5A–5E.

Figure 4A:
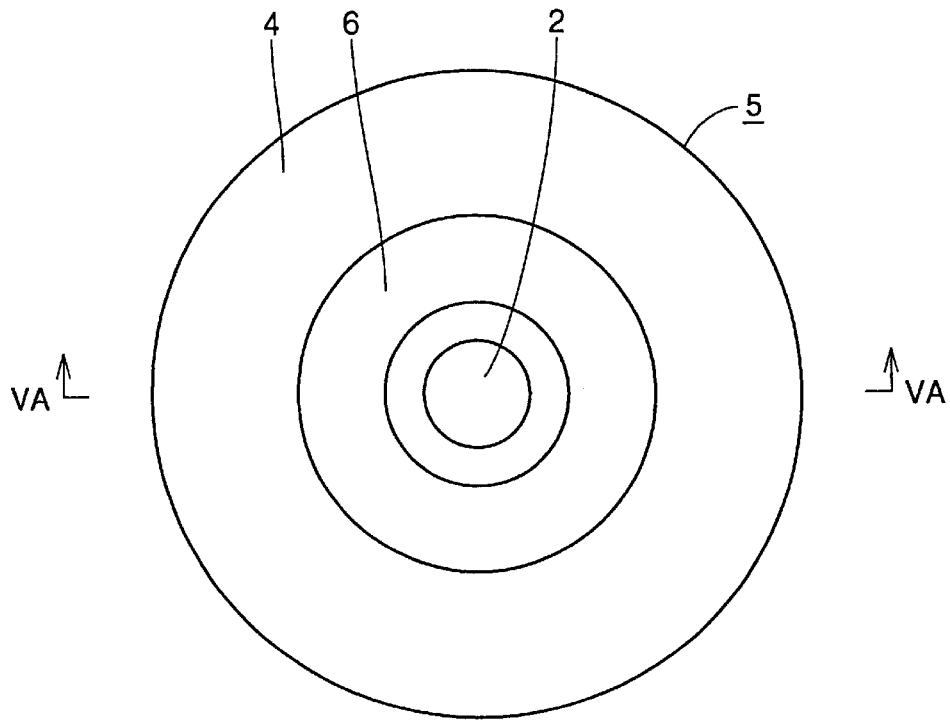
FIG. 4A is a plan view of a transparent substrate of the optical disk of FIGS. 2 and 3 viewed from a signal recording plane.
Figure 5A:
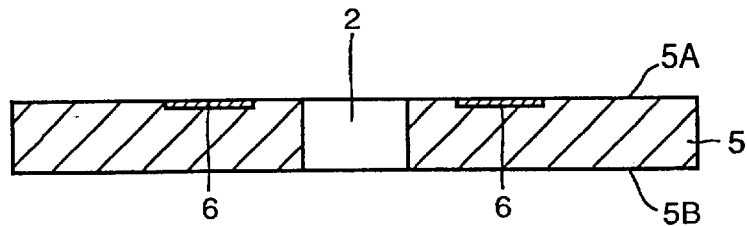
FIG. 5A is a sectional view taken along line VA—VA of FIG. 4A.

As shown in FIGS. 4A and 5A, a transparent substrate 5 having a center hole 6 and a data recording region 6 is prepared.

Figure 4B:
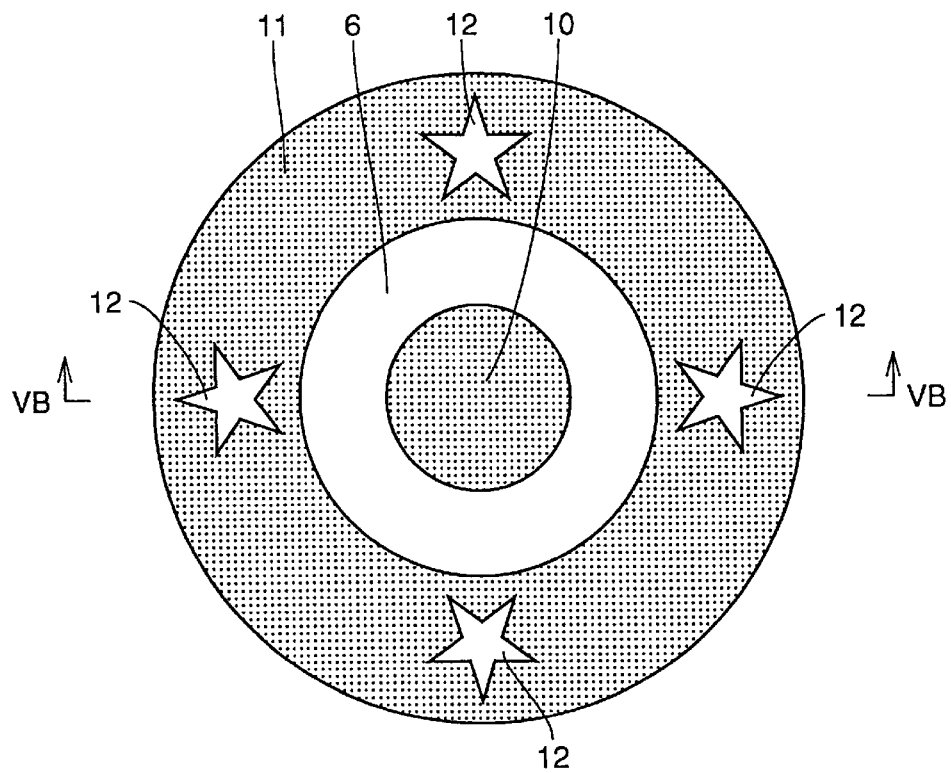
FIG. 4B is a plan view showing the step of attaching a mask on the transparent substrate of FIG. 4A.
Figure 5B:
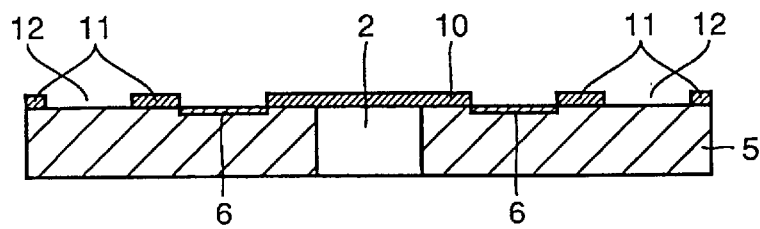
FIG. 5B is a sectional view taken along line VB—VB of FIG. 4B.

As shown in FIGS. 4B and 5B, an inner mask 10 and an outer mask 11 are attached on a region (the region of scattered dots in FIG. 4B) other than data recording region 6 and the region located at the outer circumferential side of data recording region 6 and that forms a pattern (the open region in FIG. 4B). Inner mask 10 covers the center region inner of data recording region 6. Outer mask 11 covers outer circumferential region 4 outer of data recording region 6. It is to be noted that outer mask 11 does not cover the region that forms the star-shaped pattern since outer mask 11 has four star-like openings 12.

Figure 4C:
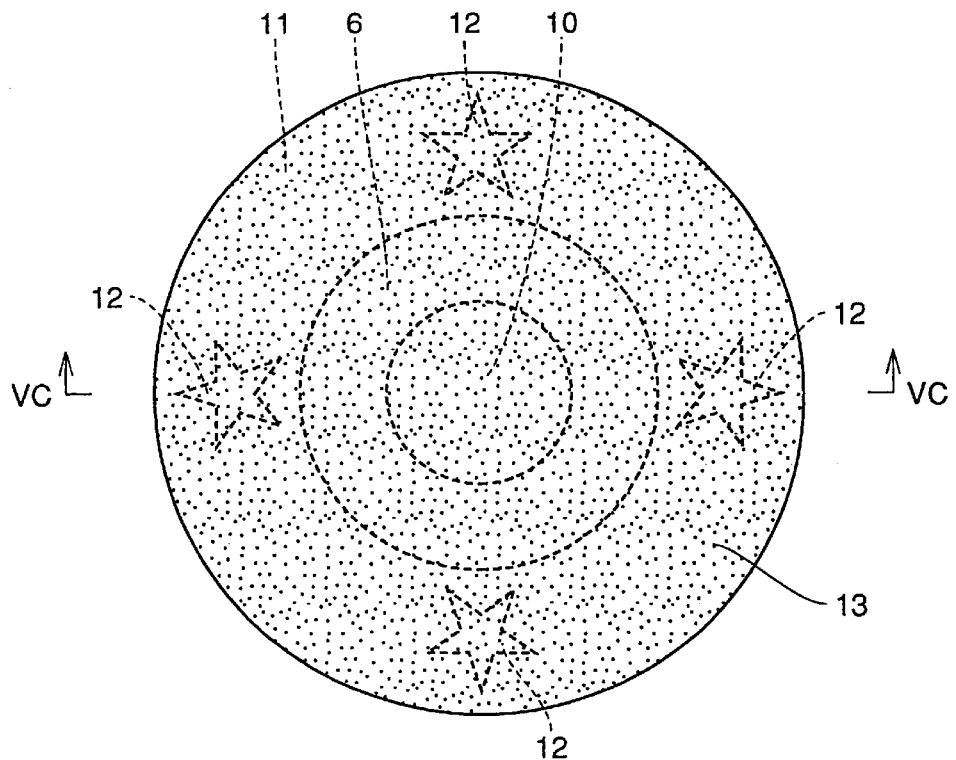
FIG. 4C is a plan view showing the step of forming a reflective film subsequent to the step of FIG. 4B.
Figure 5C:
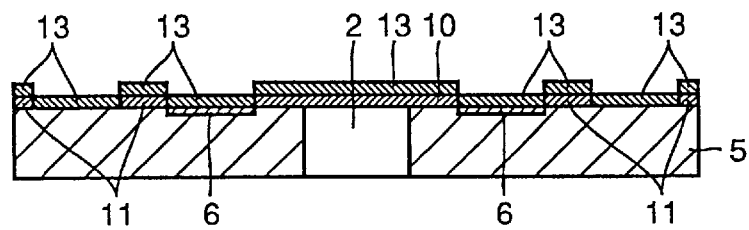
FIG. 5C is a sectional view taken along line VC—VC of FIG. 4C.

As shown in FIGS. 4C and 5C, a reflective film 13 is formed by vapor-deposition on transparent substrate 5 where inner and outer masks 10 and 11 are attached. Since transparent substrate 5 is partially masked as described above, reflective film 13 is directly in contact with the region that is not masked.

Figure 4D:
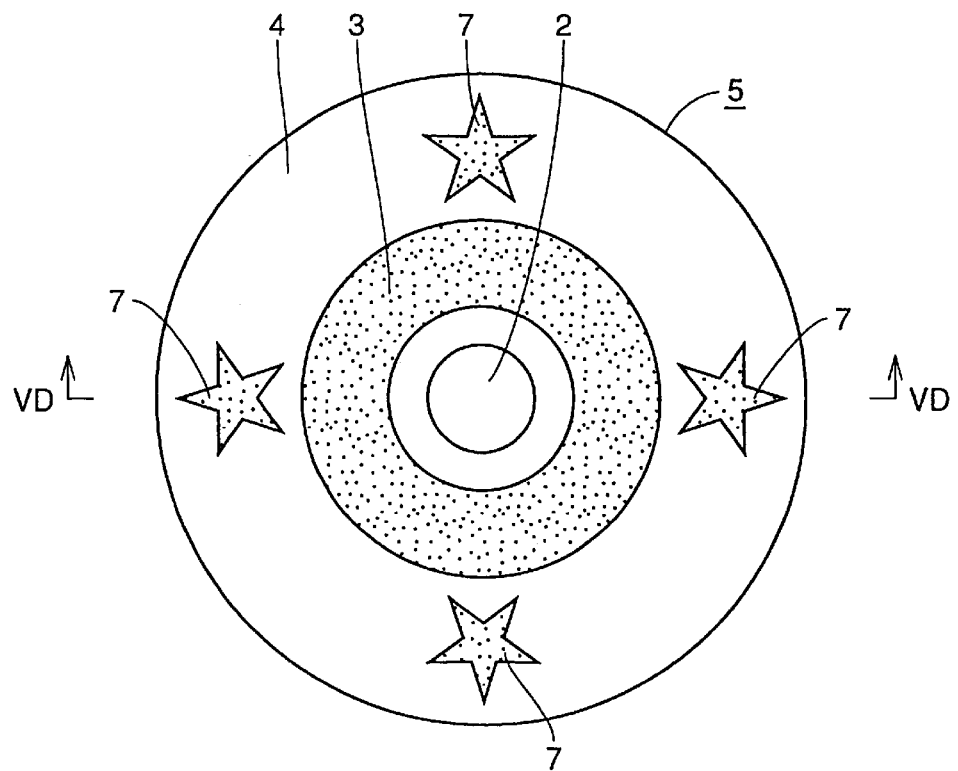
FIG. 4D is a plan view showing the step of removing the mask subsequent to the step of FIG. 4C.
Figure 5D:
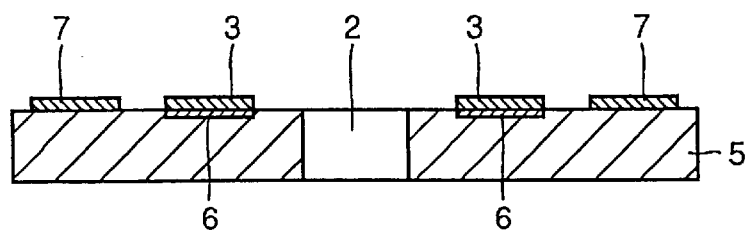
FIG. 5D is a sectional view taken along line VD—VD of FIG. 4D.

Referring to FIGS. 4D and 5D, inner and outer masks 10 and 11 are removed from transparent substrate 5. As a result, the portion of reflective film 13 formed on data recording region 6 remains as reflective film 3 whereas the portion of reflective film 13 formed on the region corresponding to the star-shape pattern remains as reflective film 7. Therefore, reflective film 3 is located on data recording region 6, and reflective film 7 is located on outer circumferential region 4, forming a star-shape pattern.

Figure 5E:
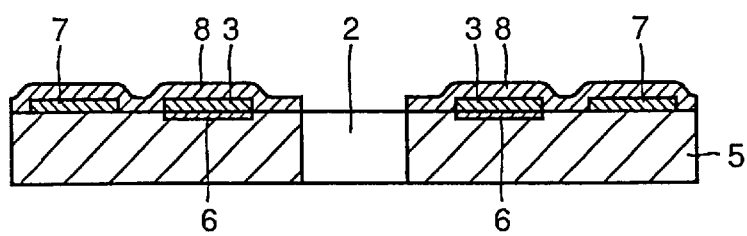
FIG. 5E is a sectional view showing the step of forming a protection film subsequent to the step of FIG. 5D.

Referring to FIG. 5E, a transparent protection film 8 is formed on transparent substrate 5 where reflective films 3 and 7 are formed.

Then, a label 9 is fixed on protection film 8 to complete optical disk 1, as shown in FIG. 3.

According to the first embodiment of the present invention, a star-shape pattern is added in the outer circumferential region 4 that was not utilized in a conventional disk. Therefore, optical disk 1 is improved to become an attractive product. The number of processing steps will not be increased since reflective film 7 forming the pattern is formed together with reflective film 3 on data recording region 6. Thus, optical disk 1 can be fabricated economically.

Second Embodiment

Figure 6:
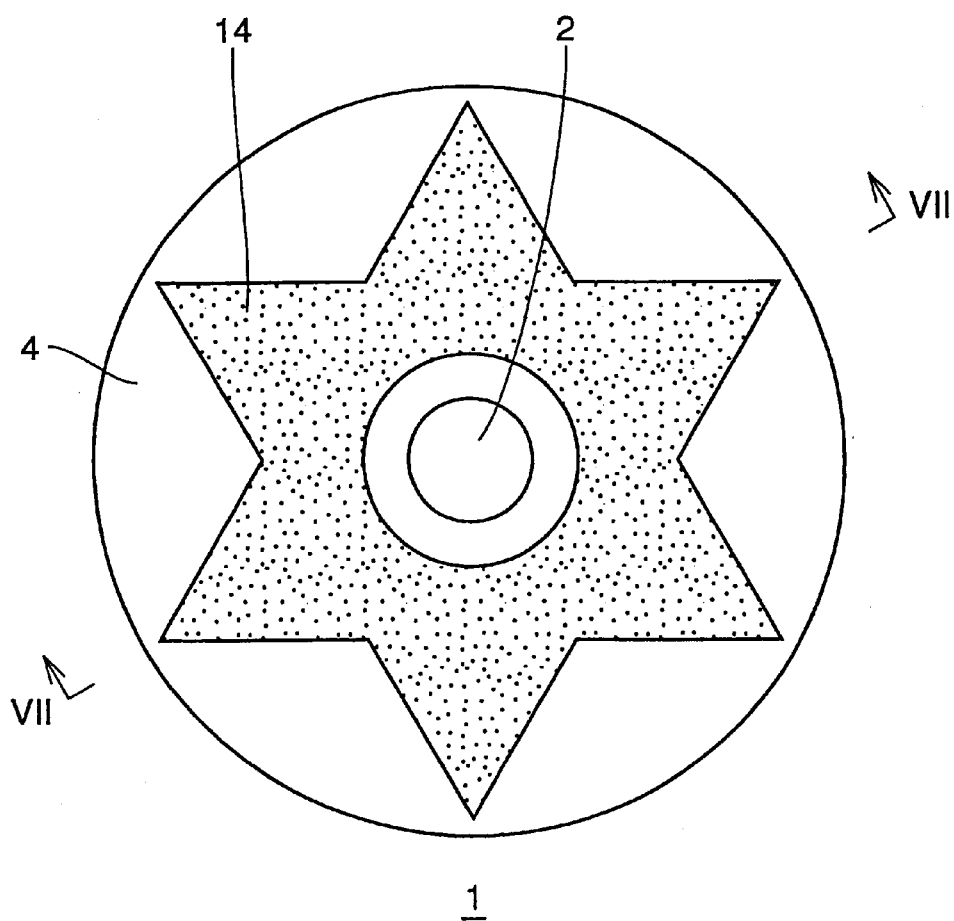
FIG. 6 is a plan view of an optical disk according to a second embodiment of the present invention viewed from the light incident plane.
Figure 7:
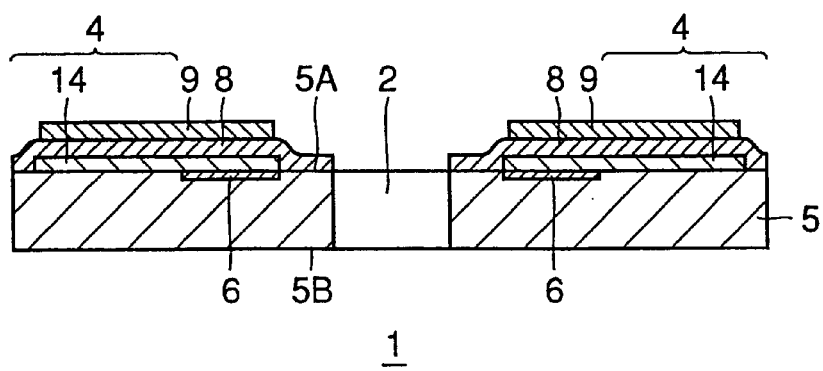
FIG. 7 is a sectional view of the optical disk of FIG. 6. taken along line VII—VII.
Figure 8:
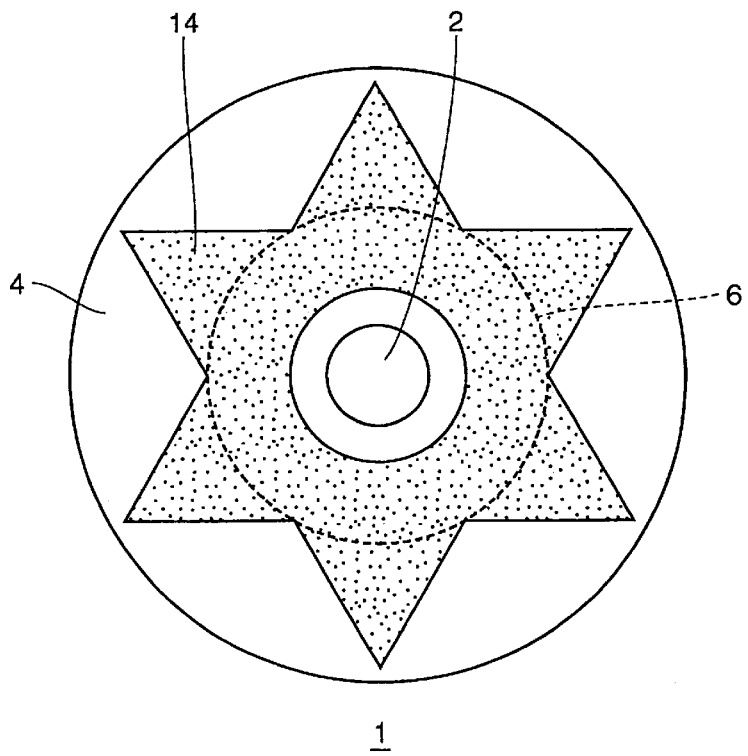
FIG. 8 is a plan view of the optical disk of FIG. 6 with the data recording region represented by a broken line.

An optical disk 1 according to a second embodiment of the present invention shown in FIGS. 6 and 7 includes one sheet of a reflective film 14 forming a star-shape pattern as a whole instead of the above-described reflective films 3 and 7. Reflective film 14 of the second embodiment is formed to cover the entirety of data recording region 6 and extends to outer circumferential region 4 as shown in FIG. 8. The portion on outer circumferential region 4 forms the pattern.

Although the reflective film forming the pattern may be spaced apart from reflective film 3 on data recording region 6 as in the first embodiment, the reflective film forming the pattern may be brought into contact with the reflective film on data recording region 6 as in the second embodiment.

In the present embodiment, reflective film 14 forms a star-shape pattern as a whole. Alternatively, a pattern such as a snow crystal pattern, a character pattern, and the like can be formed.

Third Embodiment

Figure 9:
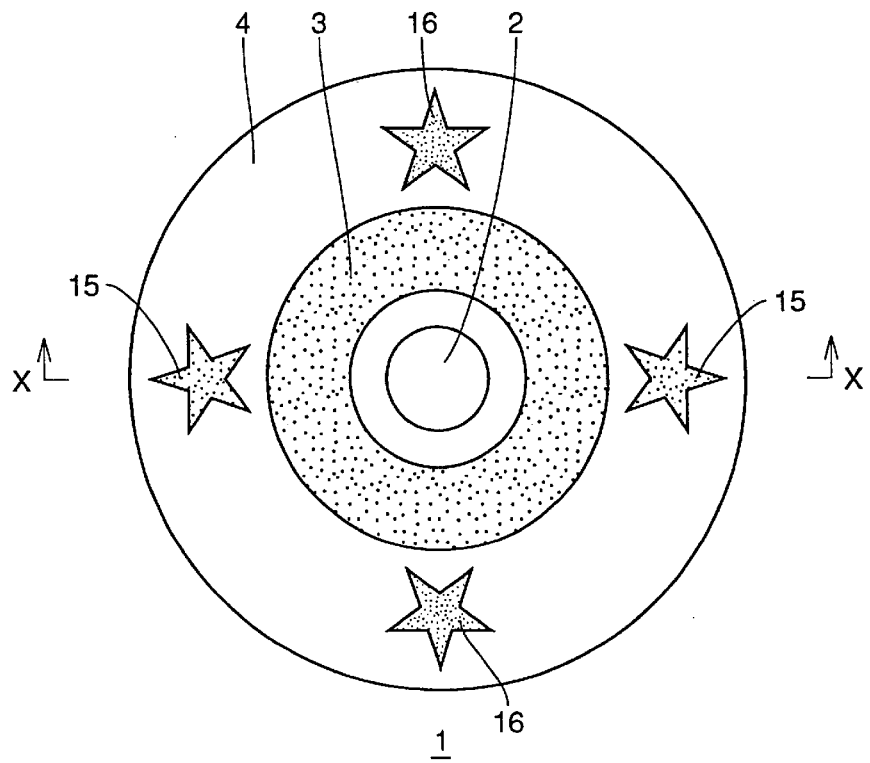
FIG. 9 is a plan view of an optical disk according to a third embodiment of the present invention viewed from the light incident plane.
Figure 10:
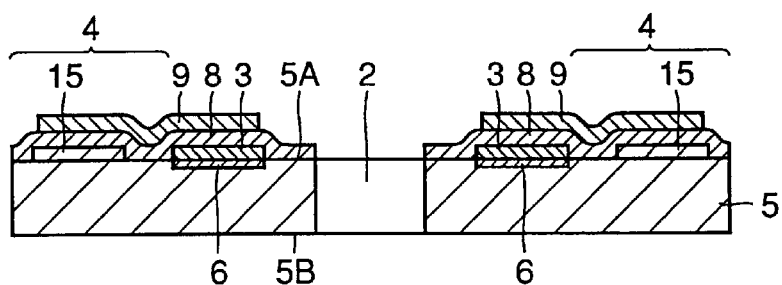
FIG. 10 is a sectional view of the optical disk of FIG. 9 taken along line X—X.

An optical disk 1 according to a third embodiment of the present invention shown in FIGS. 9 and 10 includes two gold reflective films 15 and two titanium reflective films 16 instead of the aluminum reflective film 7 shown in FIG. 2. Therefore, reflective films 3, 15 and 16 all have colors differing from each other. As a result, optical disk 1 according to the third embodiment is more colorful than the optical disk of the first embodiment.

The method of fabricating optical disk 1 of the present embodiment will be described hereinafter with reference to FIGS. 11A–11I and 12A–12I.

Figure 11A:
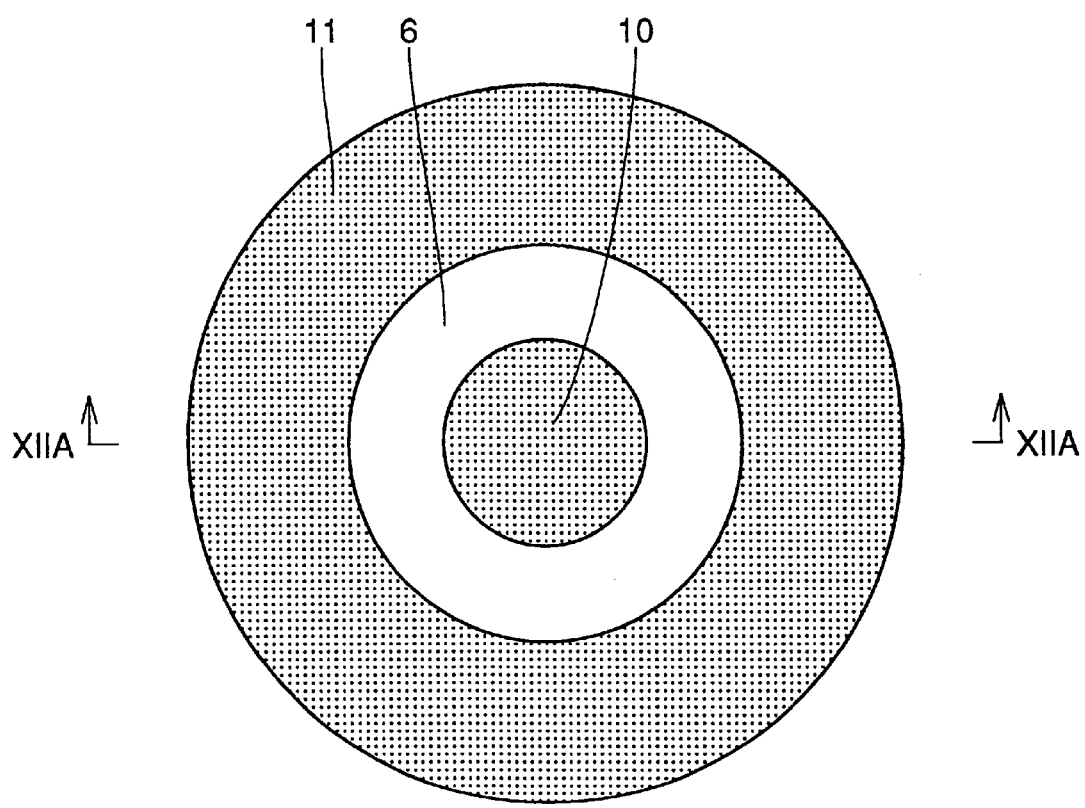
FIG. 11A is a plan view of the optical disk of FIGS. 9 and 10 indicating the step of attaching a mask subsequent to the step shown in FIG. 4B in the fabrication method thereof.
Figure 12A:
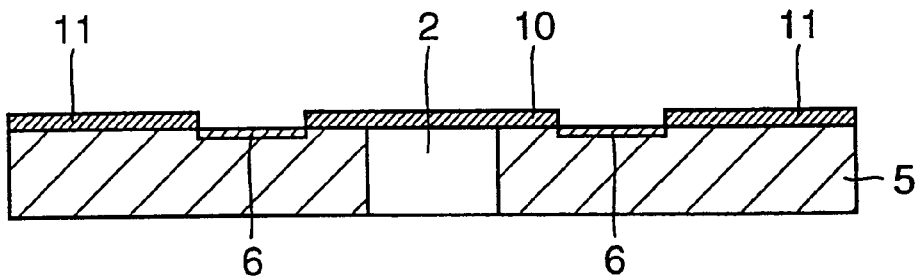
FIG. 12A is a sectional view taken along line XIIA—XIIA of FIG. 11A.

After preparing transparent substrate 5 with a data recording region 6 as shown in FIGS. 4A and 5A, an inner mask 10 and an outer mask 11 are attached on a region other than data recording region 6 as shown in FIGS. 11A and 12A. Inner mask 10 covers the center region located inner of data recording region 6. Outer mask 11 covers outer circumferential region 4 located outer of data recording region 6. Outer mask 11 lacks the openings shown in FIG. 4B.

Figure 11B:
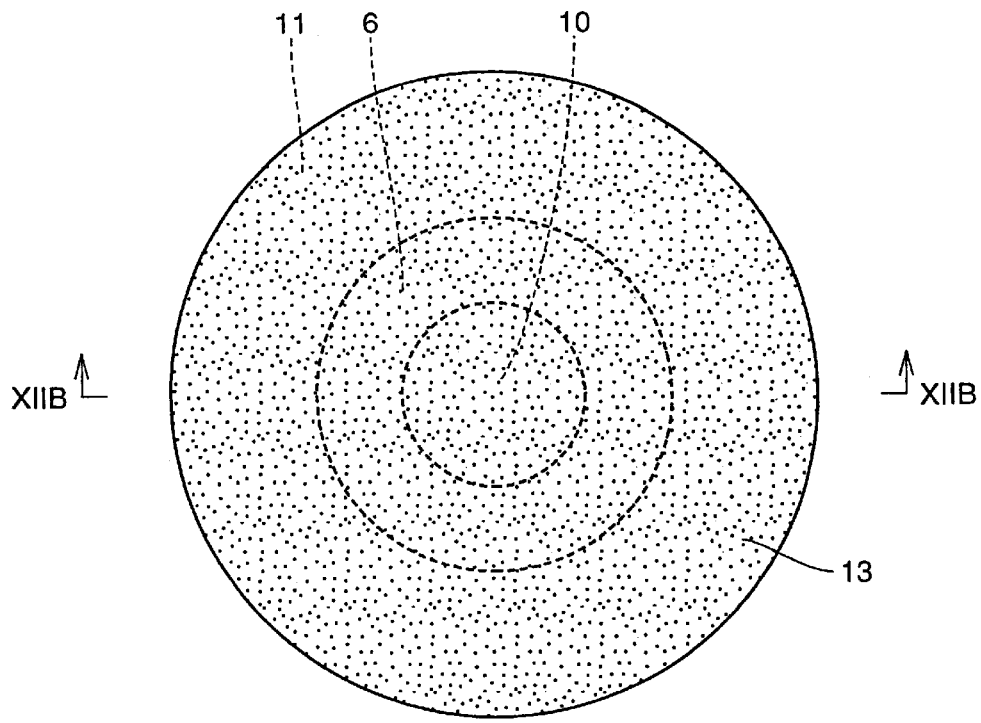
FIG. 11B is a plan view showing the step of forming a reflective film subsequent to the step of FIG. 11A.
Figure 12B:
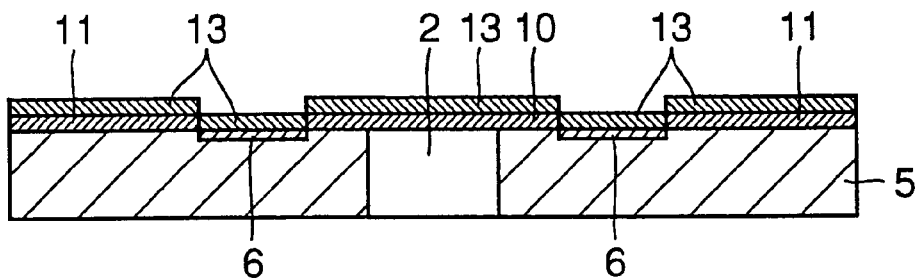
FIG. 12B is a sectional view taken along line XIIB—XIIB of FIG. 11B.

Referring to FIGS. 11B and 12B, an aluminum reflective film 13 is formed by vapor-deposition on transparent substrate 5 where inner and outer masks 10 and 11 are attached. Therefore, reflective film 13 forms direct contact with data recording region 6 that is not masked.

Figure 11C:
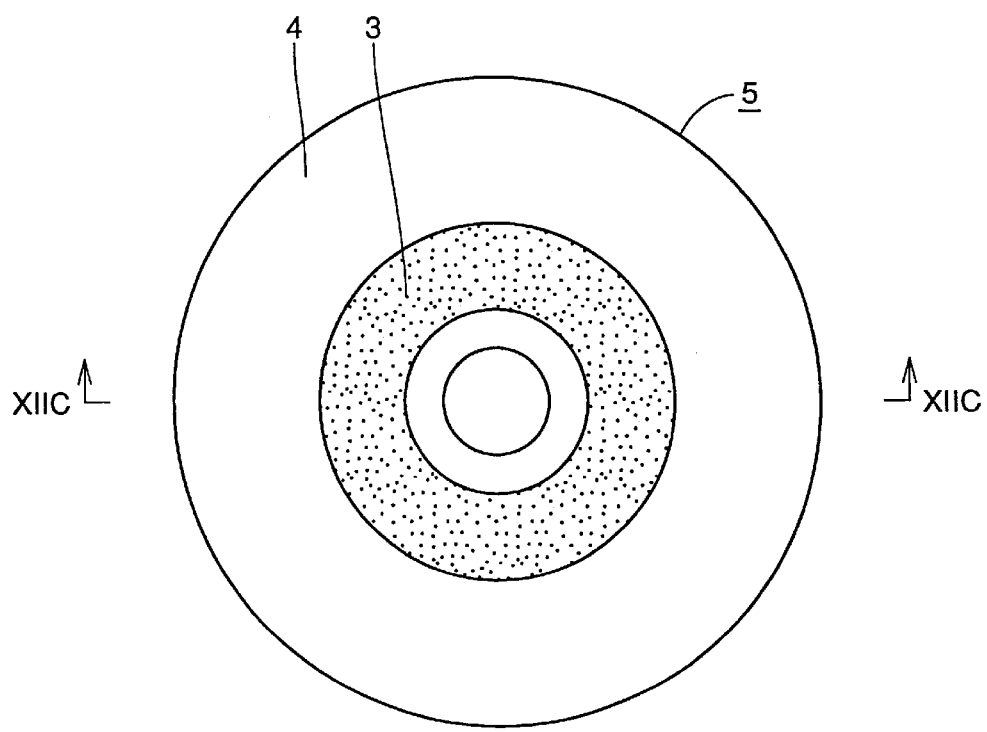
FIG. 11C is a plan view showing the step of removing the mask subsequent to the step of FIG. 11B.
Figure 12C:
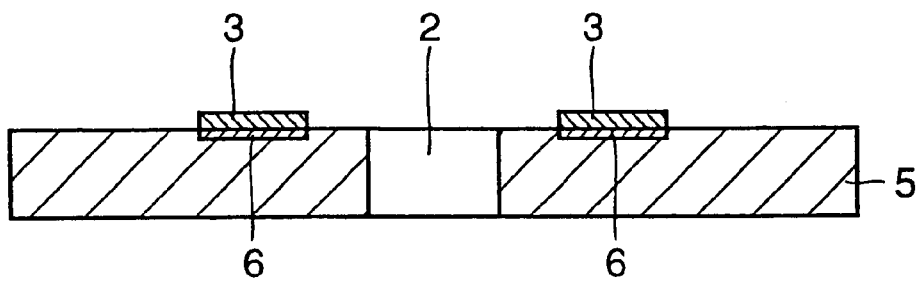
FIG. 12C is a sectional view taken along line XIIC—XIIC of FIG. 11C.

Referring to FIGS. 11C and 12C, inner mask 10 and outer mask 11 are detached from transparent substrate 5. As a result, only the region of reflective film 13 on data recording region 6 out of reflective film 13 on transparent substrate 5 remains as reflective film 3. Therefore, no reflective film is formed on outer circumferential region 4.

Figure 11D:
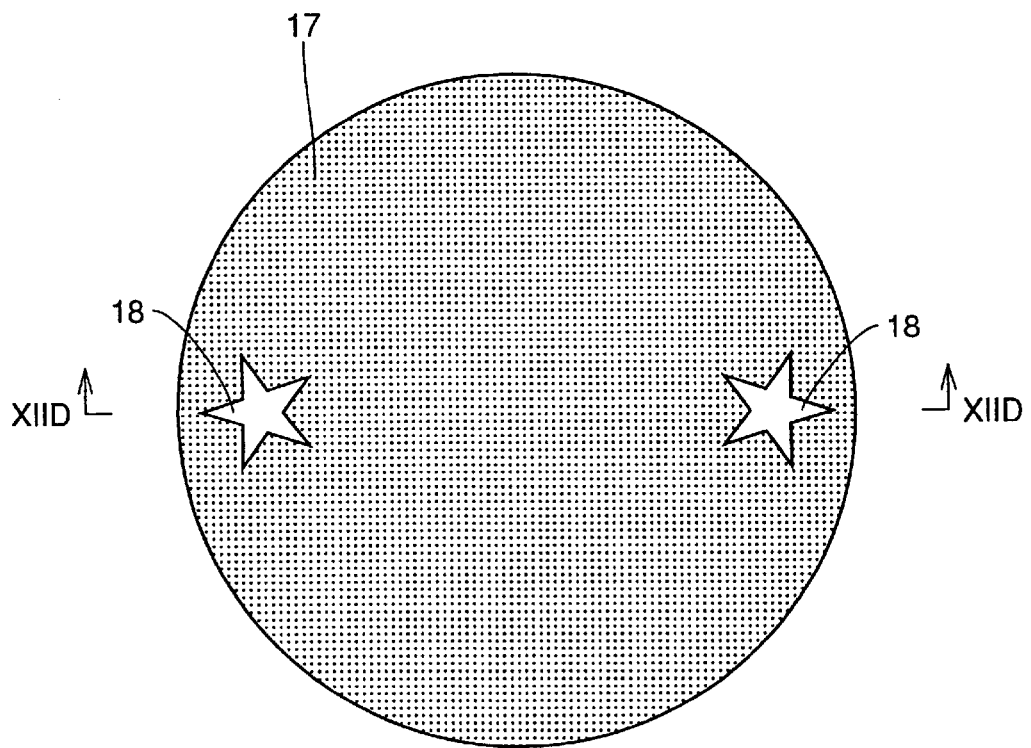
FIG. 11D is a plan view showing the step of attaching another mask subsequent to the step of FIG. 11C.
Figure 12D:
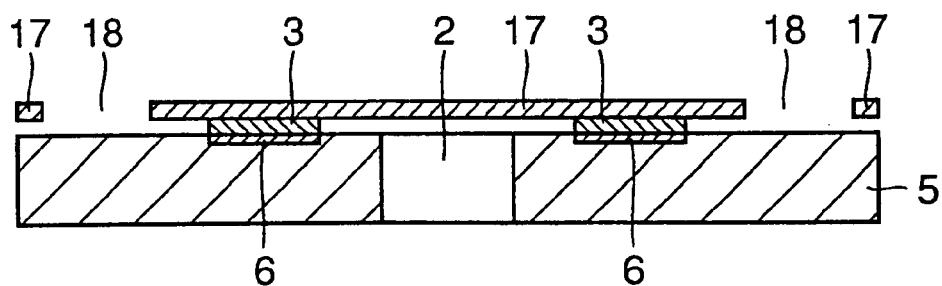
FIG. 12D is a sectional view taken along line XIID—XIID of FIG. 11D.

Referring to FIGS. 11D and 12D, a mask 17 is attached on transparent substrate 5 where reflective film 3 is formed. Mask 17 has two star-shape openings 18. These openings 18 are located within outer circumferential region 4 of transparent substrate 5 and on the region forming the pattern. Therefore, the region other than the region forming this pattern is masked.

Figure 11E:
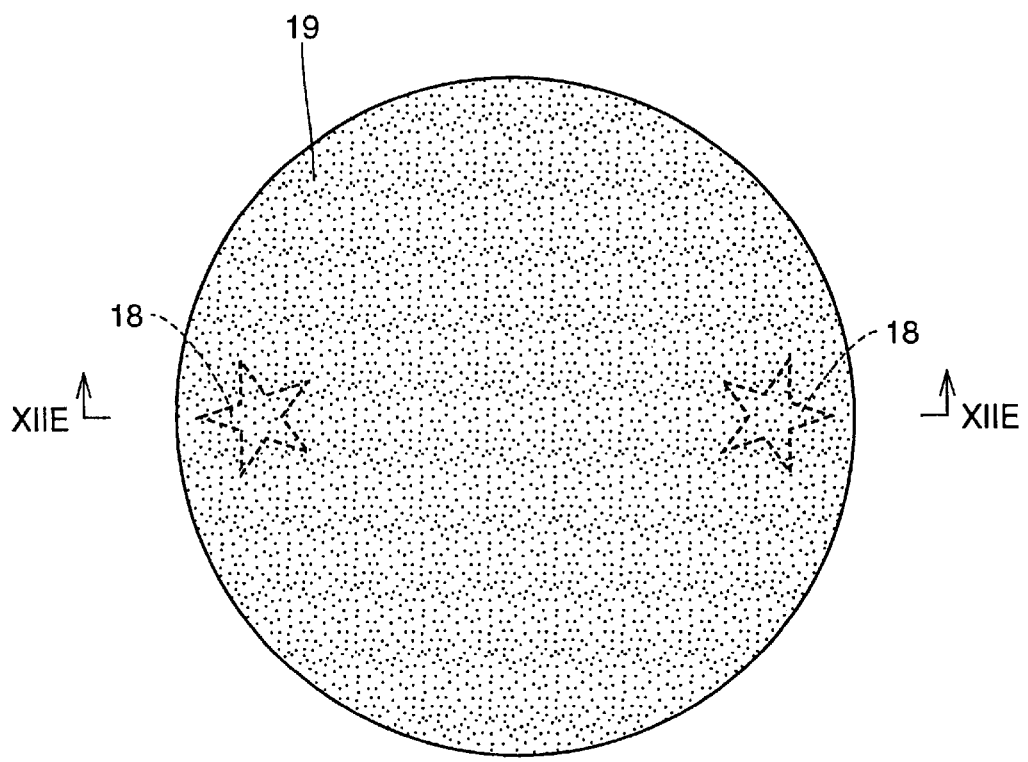
FIG. 11E is a plan view showing the step of forming another reflective film subsequent to the step of FIG. 11D.
Figure 12E:
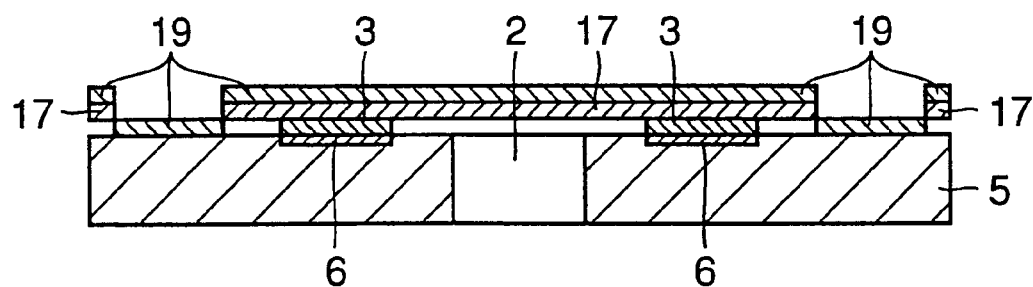
FIG. 12E is a sectional view taken along line XIIE—XIIE of FIG. 11E.

Referring to FIGS. 11E and 12E, a gold reflective film 19 is formed by vapor-deposition on transparent substrate 5 where mask 17 is attached. Since the region that forms the pattern is not masked, reflective film 19 is in direct contact with the exposed region.

Figure 11F:
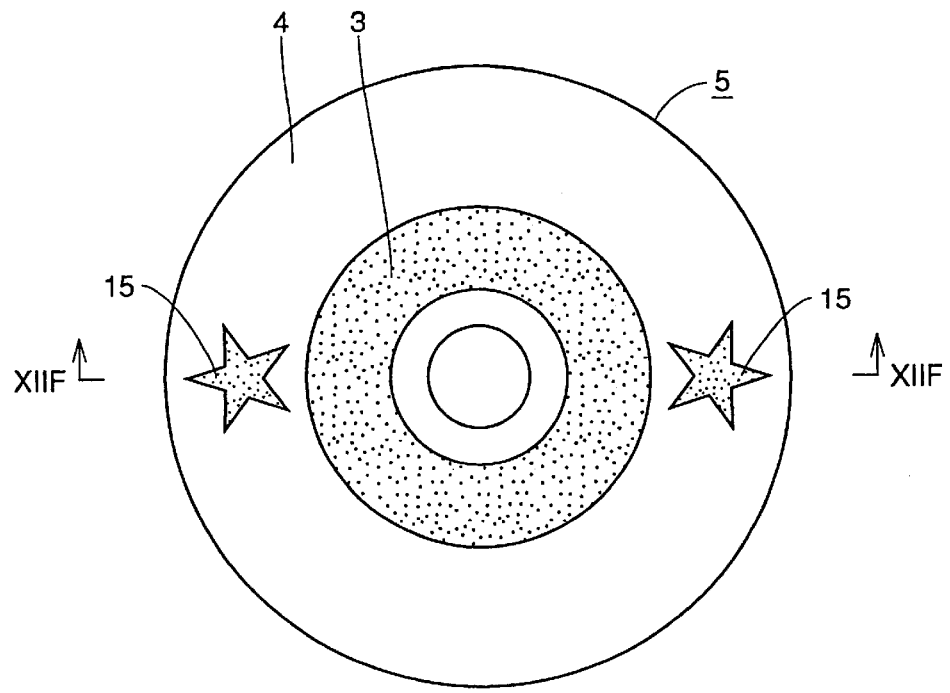
FIG. 11F is a plan view showing the step of removing the mask subsequent to the step of FIG. 11E.
Figure 12F:
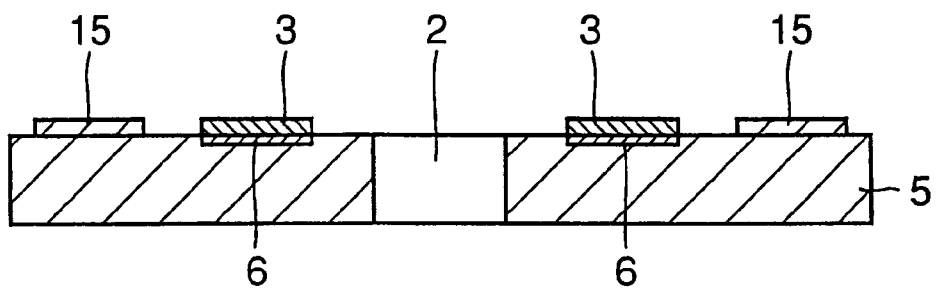
FIG. 12F is a sectional view taken along line XIIF—XIIF of FIG. 11F.

Referring to FIGS. 11F and 12F, mask 17 is removed from transparent substrate 5. As a result, only the portion of reflective film 19 located on the region forming the pattern remains out of reflective film 19 formed entirely on transparent substrate 5.

Figure 11G:
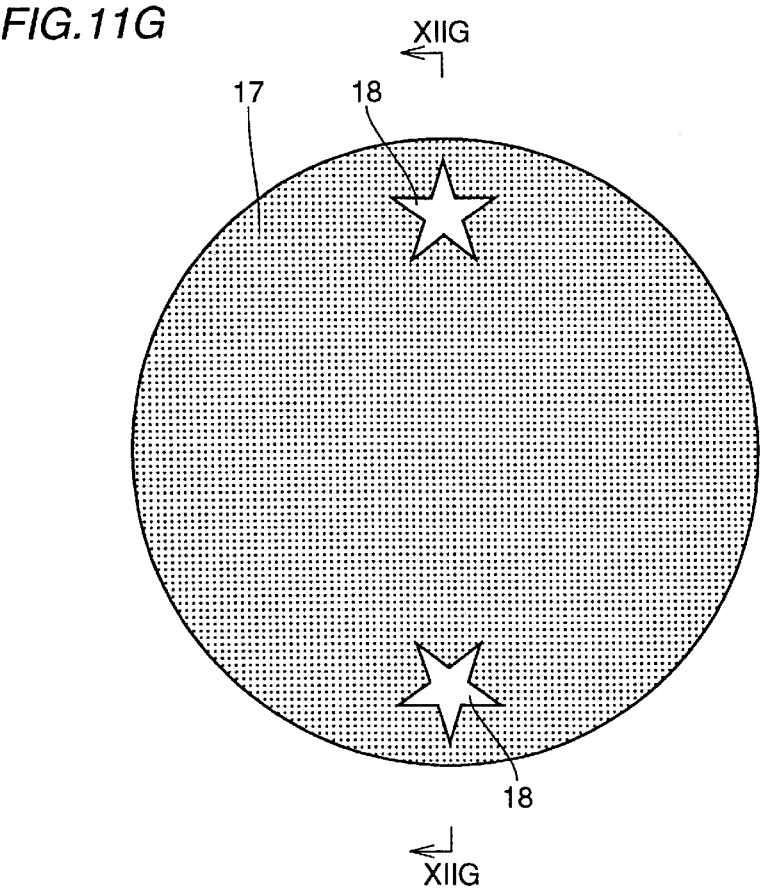
FIG. 11G is a plan view showing the step of attaching a mask again subsequent to the step of FIG. 11F.
Figure 12G:
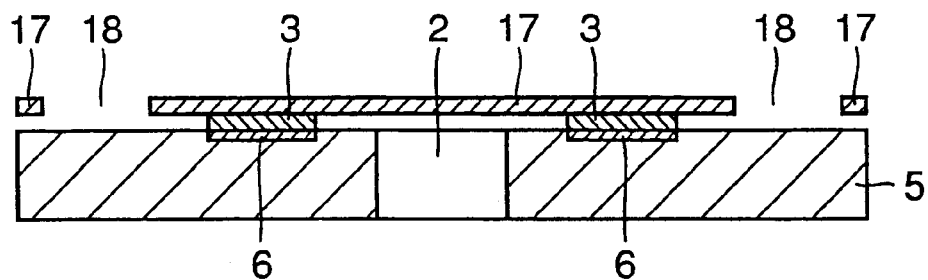
FIG. 12G is a sectional view taken along line XIIG—XIIG of FIG. 11G.

Referring to FIGS. 11G and 12G, mask 17 is attached again on transparent substrate 5 where transparent films 3 and 15 are formed, provided that the two openings 18 are located differing by 90° from openings of FIG. 11D.

Figure 11H:
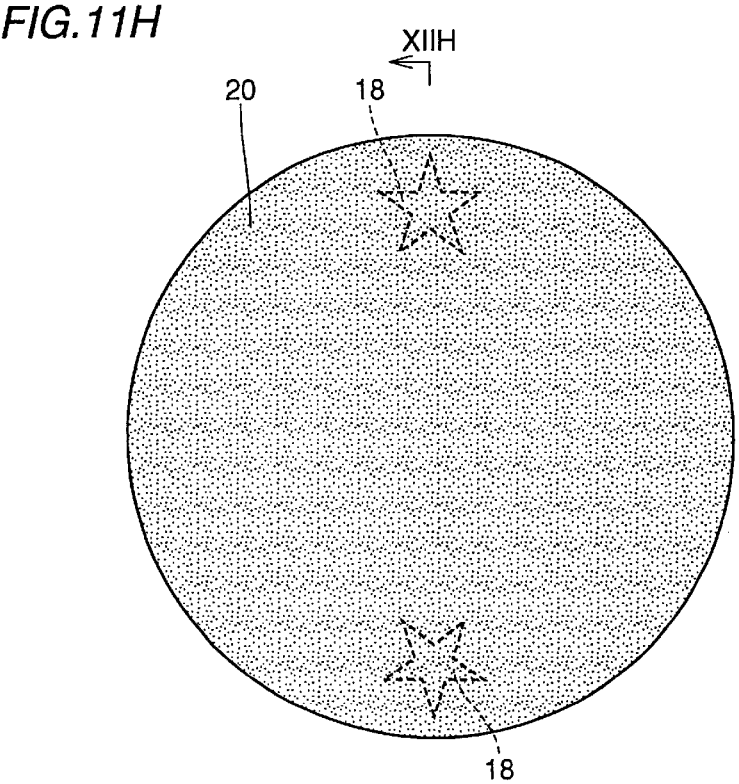
FIG. 11H is a plan view showing the step of forming another reflective film subsequent to the step of FIG. 11G.
Figure 12H:
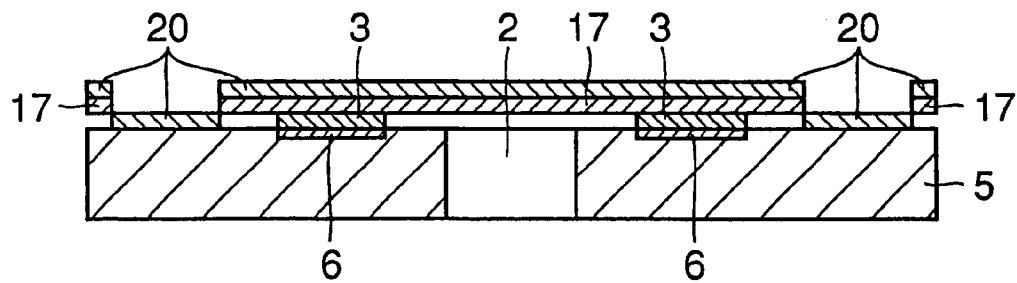
FIG. 12H is a sectional view taken along line XIIH—XIIH of FIG. 11H.

Referring to FIGS. 11H and 12H, a titanium reflective film 20 is formed on transparent substrate 5 where mask 17 is attached. Since the region forming the star-shape pattern is not masked, reflective film 20 is in direct contact with the exposed region thereof.

Figure 11I:
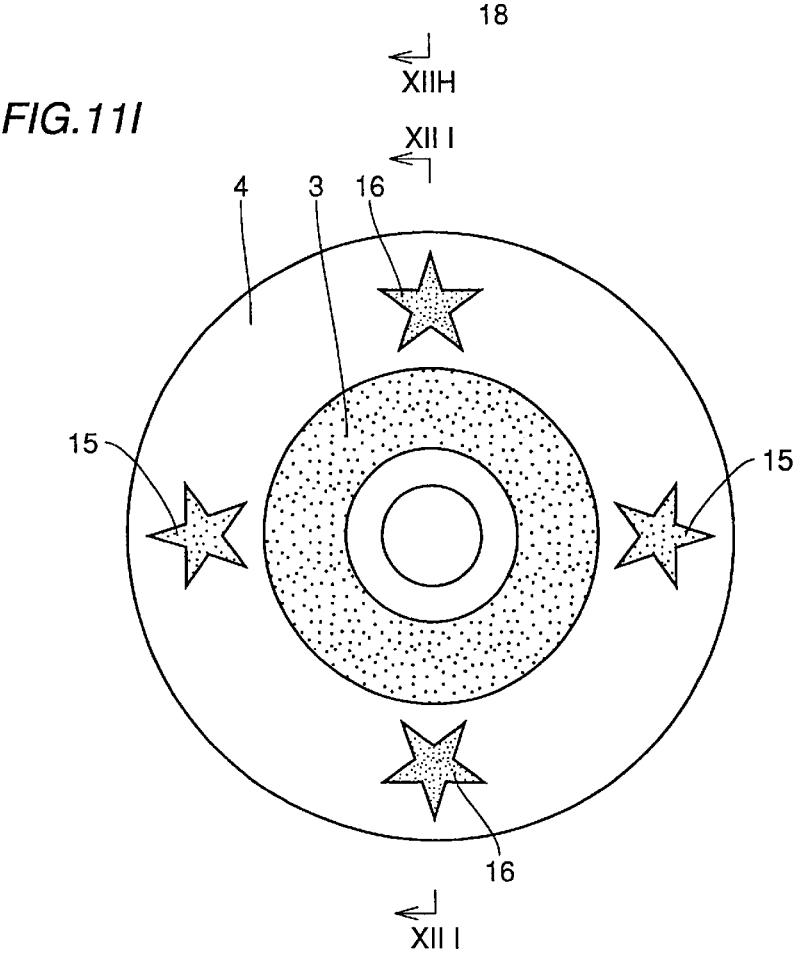
FIG. 11I is a plan view showing the step of removing the mask subsequent to the step of FIG. 11H.
Figure 12I:
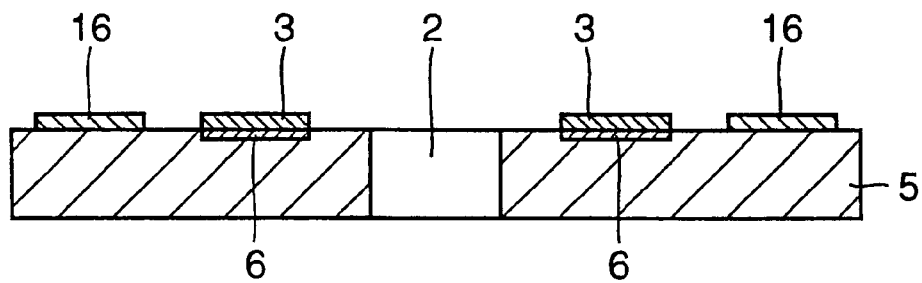
FIG. 12I is a sectional view taken along line XIII—XIII of FIG. 11I.
Figure 13:
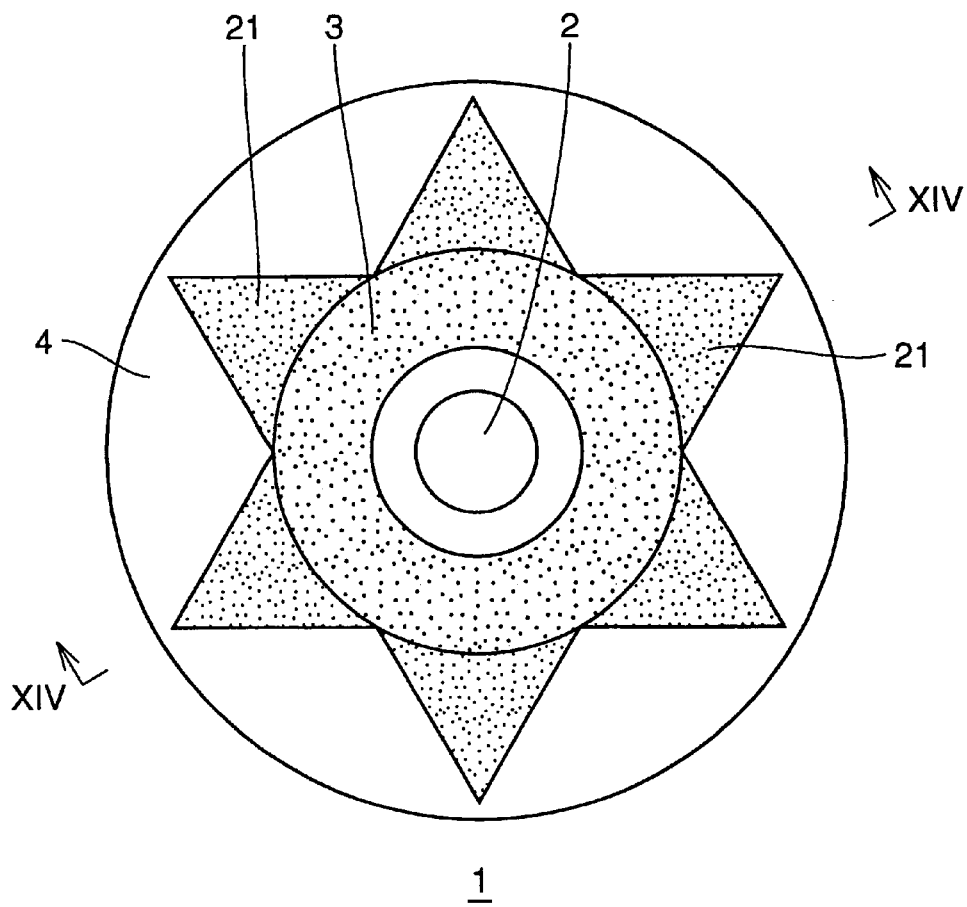
FIG. 13 is a plan view of an optical disk according to a fourth embodiment of the present invention viewed from the light incident plane.

Referring to FIGS. 11I and 12I, mask 17 is removed from transparent substrate 5. As a result, only the portion of reflective film 20 located on the region that forms a star-shape pattern remains out of reflective film 20 formed on transparent substrate 5. Therefore, aluminum reflective film 3, gold reflective film 15 forming the star-shape pattern, and titanium reflective film 16 forming the star-shape pattern are located on transparent substrate 5.

Following formation of a transparent protection film 8 similar to the step of FIG. 5E, label 9 is attached on protection film 8 as shown in FIG. 10. Thus, optical disk 1 is completed.

According to the third embodiment of the present invention, an optical disk 1 having three different colors can be fabricated at a low cost.

Although gold and titanium are employed for reflective films 15 and 16, respectively, forming the pattern in the present embodiment, metal other than aluminum such as copper, nickel, antimony, manganese, and any other metal that can be vapor-deposited may be employed. Also, plastic besides metal can be employed. Furthermore, a pattern can be printed directly instead of providing a reflective film that forms a pattern by vapor-deposition.

In the present embodiment, patterns of two colors are provided by exchanging the mask two times. Patterns of three colors and more can be provided by exchanging the mask three times or more.

Fourth Embodiment

In contrast to the optical disk shown in FIG. 6 where reflective film 14 is formed only of aluminum over data recording region 6 and outer circumferential region 4, optical disk 1 according to a fourth embodiment of the present invention has an aluminum reflective film 3 formed on data recording region 6 and a gold reflective film 21 formed on outer circumferential region 4. As a result, optical disk 1 has two types of colors.

Fifth Embodiment

In contrast to the optical disk of the above first to fourth embodiments in which the reflective film forming a pattern is provided by vapor-deposition, the optical disk of the present fifth embodiment has the pattern formed by screen printing.

Figure 15A:
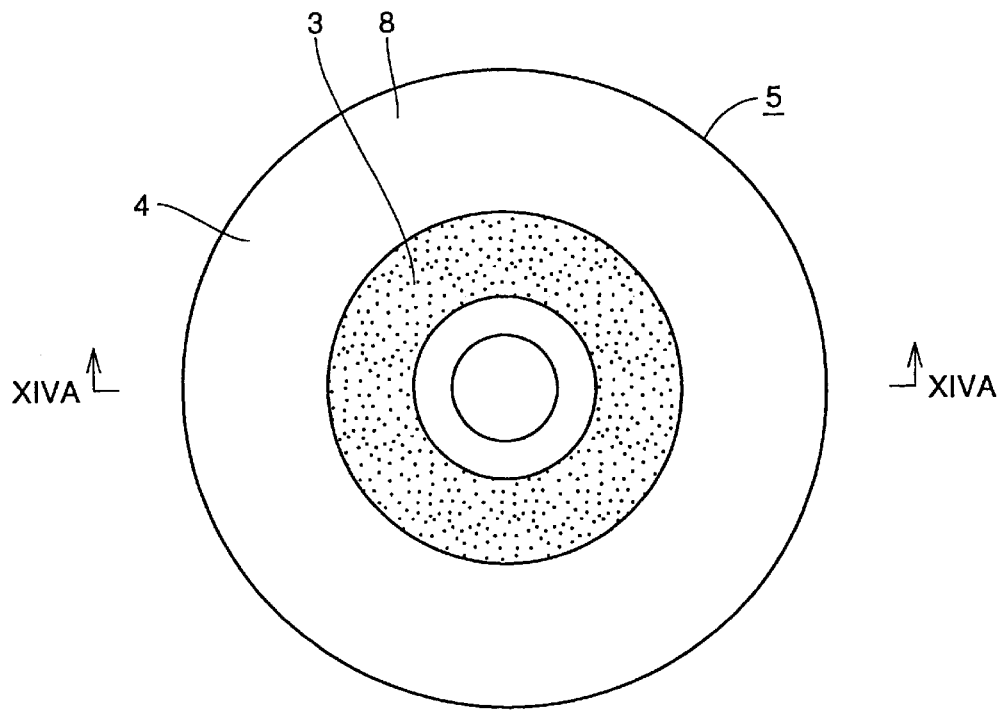
FIG. 15A is a plan view showing the step of forming a transparent protection film subsequent to the step of FIG. 11C in fabricating an optical disk according to a fifth embodiment of the present invention.
Figure 16A:
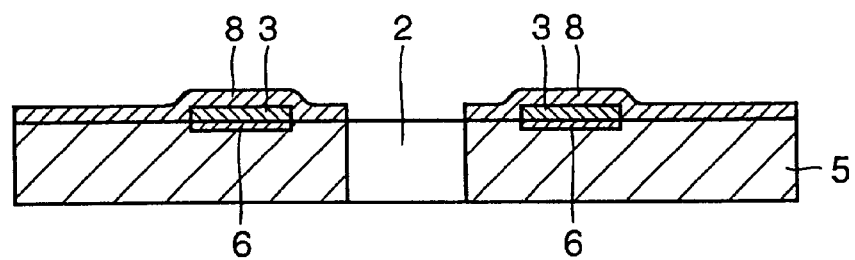
FIG. 16A is a sectional view taken along line XVIA—XVIA of FIG. 15A.

In order to fabricate such an optical disk, subsequent to formation of an aluminum reflective film on data recording region 6 of transparent substrate 5 by vapor-deposition as shown in FIG. 11C, a transparent protection film 8 is formed as shown in FIGS. 15A and 16A.

Figure 15B:
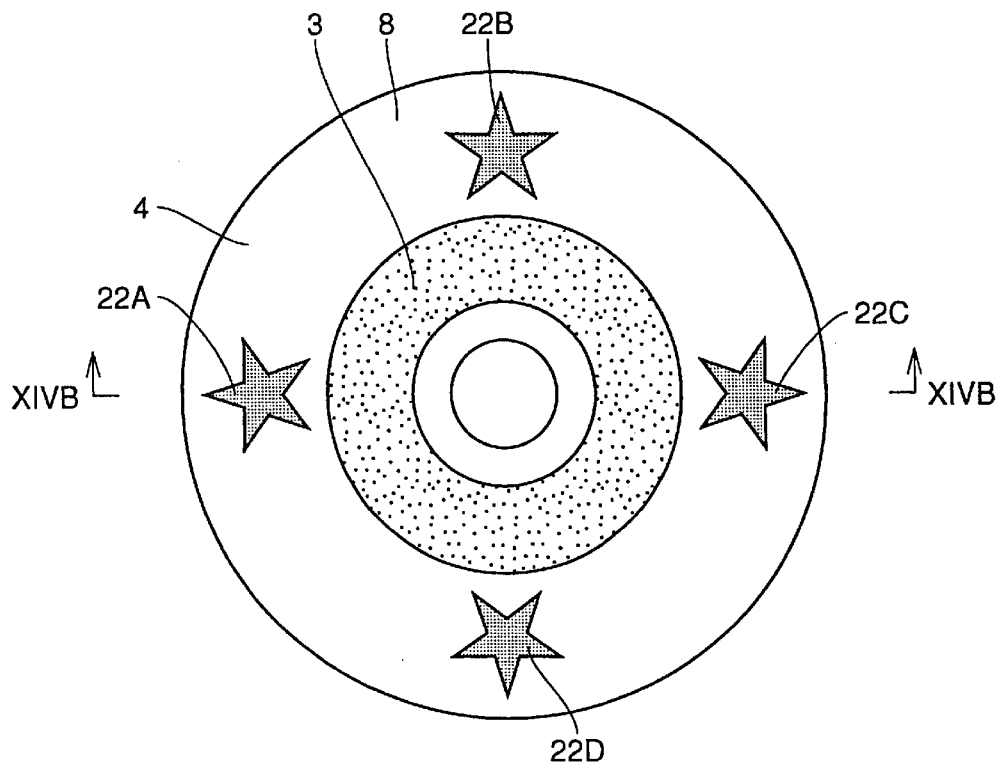
FIG. 15B is a plan view showing the step of printing a pattern subsequent to the step of FIG. 15A.
Figure 16B:
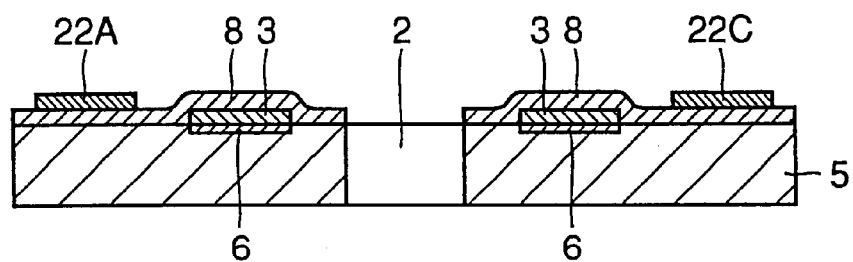
FIG. 16B is a sectional view taken along line XVIB—XVIB of FIG. 15B.

Referring to FIGS. 15b and 16B, films 22A–22D forming a star-shape pattern are formed by screen printing and the like on transparent protection film 8 and in outer circumferential region 4 at the outer circumferential side of data recording region 6.

The pattern is printed in the present fifth embodiment. Therefore, an optical disk that has multi-colored patterns such as a silver reflective film 3, a red film 22A, a blue film 22B, a yellow film 22C and a green film 22D can be fabricated at a low cost.

Sixth Embodiment

Since the label is formed to cover the reflective film entirely in the above-described embodiments, the reflective film forming a pattern can be viewed from the transparent substrate side, but not from the label side. The present sixth embodiment is directed to provide an optical disk with a reflective film that can be viewed from the label side as well as from the transparent substrate side.

Figure 17:
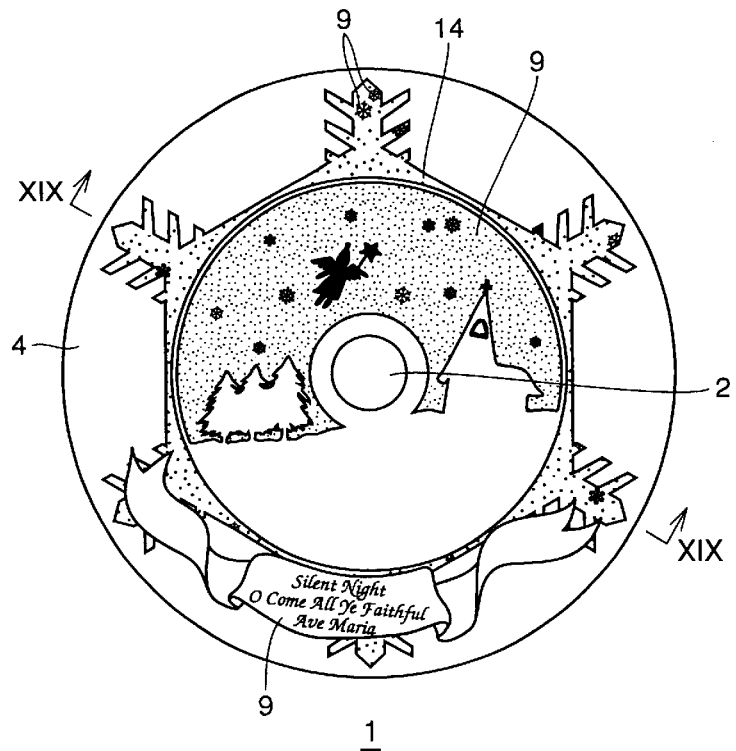
FIG. 17 is a plan view of an optical disk according to a sixth embodiment of the present application viewed from the label side (the signal recording plane).
Figure 18:
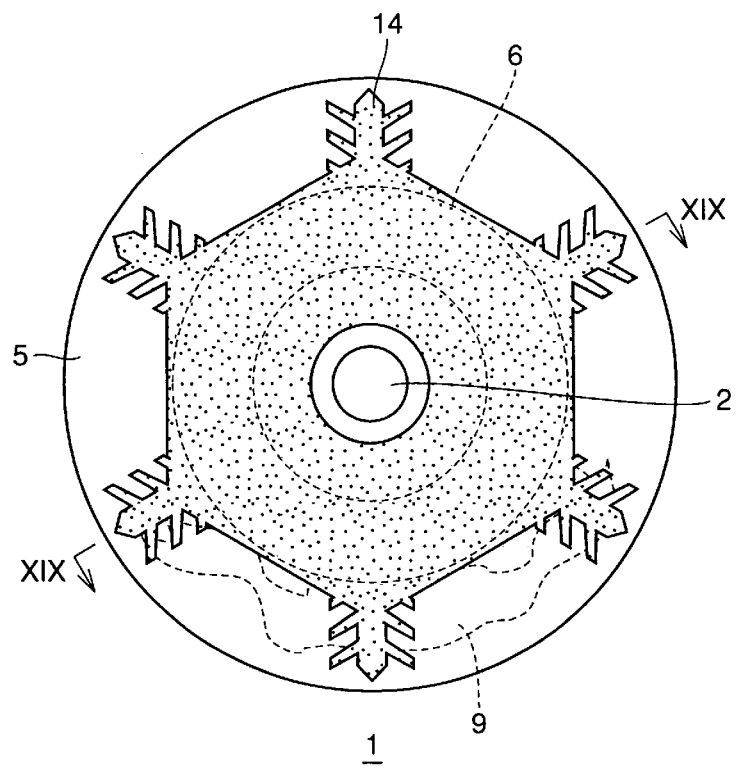
FIG. 18 is a plan view of the optical disk of FIG. 17 viewed from the transparent substrate side (the light incident surface).
Figure 19:
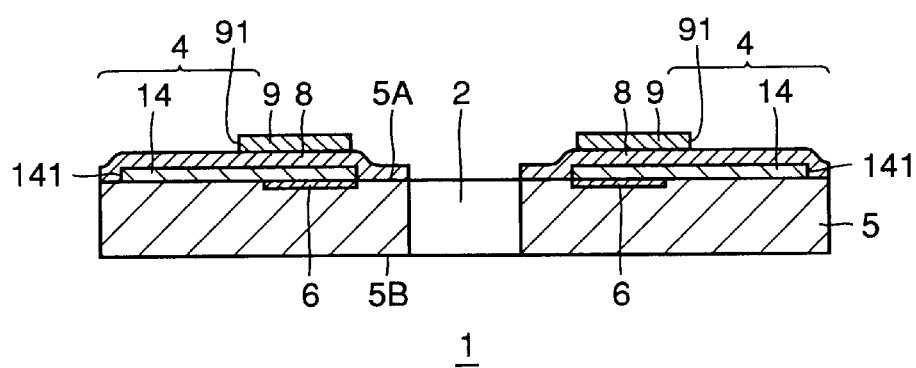
FIG. 19 is a sectional view taken along line XIX—XIX of FIG. 18.

Referring to FIGS. 17–19, optical disk 1 of the sixth embodiment has a label 9 formed on transparent protection film 8 so as to cover data recording region 6 and not cover substantially outer circumferential region 4 located at the outer circumferential side of data recording region 6. More specifically, outer edge 91 of label 9 is located at the inner side of outer edge 14 of reflective film 14 forming a pattern.

To fabricate such an optical disk 1, a label having a diameter smaller than that of reflective film 14 is deposited after protection film 8 is formed. Particularly since the pattern by reflective film 14 can be viewed from the label plane side, formation of label 9 by the multicolor print method with a plurality of colors allows label 9 of multicolor printing to be decorated with a metalic pattern that is not easily obtained by printing. The synergistic effect of decoration by the patterns of both label 9 and reflective film 14 can be achieved.

In the present embodiment, a Christmas song is recorded on optical disk 1. Label 9 covers data recording region 6 and is recorded at the outer side of the circumference of data recording region 6 so that the title is located at the lower region in FIG. 17. Reflective film 14 corresponds to a crystal pattern of snow related to the title.

Since label 9 is not formed to cover the entirety of reflective film 14, reflective film 14 forming a pattern can be viewed from the label side as well as from the transparent substrate side. The pattern from label 9 side will be viewed together with label 9, showing an appearance differing from the sole pattern of reflective film 14 from transparent substrate side 5. Thus, the synergistic effect of decoration of both the patterns of label 9 and reflective film 14 with many colors can be achieved.

Figure 14:
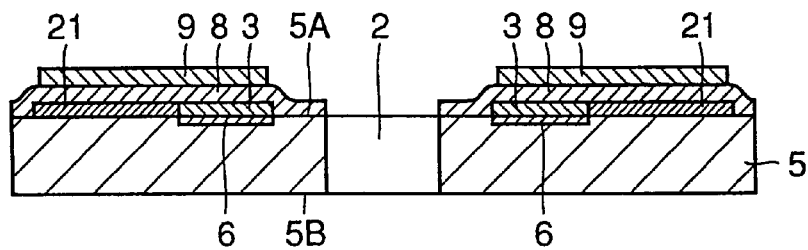
FIG. 14 is a sectional view of the optical disk of FIG. 13 taken along line XIV—XIV.

The example of the sixth embodiment corresponds to label 9 of the second embodiment with a smaller diameter. Similarly, label 9 in the first embodiment shown in FIG. 3, the third embodiment shown in FIG. 10, and the fourth embodiment shown in FIG. 14 may be formed with a smaller diameter. Label 9 does not have to cover the entirety of reflective film 14. Label 9 is to be provided so that at least a portion of reflective film 14 is exposed so that the pattern can be viewed. Label 9 is not limited to the embodiment of covering only data recording region 6.

In the present embodiment, the reflective film is formed by vapor-deposition. However, the formation thereof is not limited to this process, and can be formed by, for example, CVD. In the present embodiment, the mask is attached on the transparent substrate. Alternatively a mask can be formed on the transparent substrate by a photoresist method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disk comprising:
   a transparent substrate having a data recording region in which data is recorded at an inner circumference thereof,
   a first reflective film formed on the data recording region of said transparent substrate,
   a second reflective film formed on an outer circumferential side region of the data recording region of said transparent substrate, forming a pattern
   a transparent protection film formed on said first and second reflective films, and
   a label formed on said transparent protection film,
   wherein an outer circumferential side edge of said label is located inner than an outer circumferential side edge of said second reflective film.

2. The optical disk according to claim 1, wherein said transparent protection film is formed to cover the outer circumferential side edge of said second reflective film.

3. The optical disk according to claim 1, wherein said second reflective film is in contact with said first reflective film.

4. The optical disk according to claim 1, wherein said second reflective film is spaced apart from said first reflective film.

5. The optical disk according to claim 1, wherein said second reflective film has a color differing from the color of said first reflective film.

6. The optical disk according to claim 1, further comprising a third reflective film formed on a region at an outer circumferential side of the data recording region of said transparent substrate, forming a pattern.

7. The optical disk according to claim 6, wherein said third reflective film has a color differing from the colors of said first and second reflective films.

8. The optical disk according to claim 1, wherein said label has a plurality of colors.

9. The optical disk according to claim 8, wherein the pattern of said second reflective film decorates said label.

10. An optical disk comprising:
- a transparent substrate having a data recording region in which data is recorded at an inner circumference thereof,
- a first reflective film formed on the data recording region of said transparent substrate,
- a second reflective film formed on an outer circumferential side region of the data recording region of said transparent substrate, forming a pattern
- a transparent protection film formed on said first and second reflective films, and
- a label formed on said transparent protection film so that at least a portion of said second reflective film can be viewed.

11. The optical disk according to claim 10, wherein said label has a plurality of colors.

12. The optical disk according to claim 10, wherein the pattern of said second reflective film decorates said label.

13. The optical disk according to claim 10, wherein said transparent protection film is formed to cover the outer circumferential side edge of said second reflective film.

14. The optical disk according to claim 10, wherein said second reflective film is in contact with said first reflective film.

15. The optical disk according to claim 10, wherein said second reflective film is spaced apart from said first reflective film.

16. The optical disk according to claim 10, wherein said second reflective film has a color differing from the color of said first reflective film.

17. The optical disk according to claim 10, further comprising a third reflective film formed on a region at an outer circumferential side of the data recording region of said transparent substrate, forming a pattern.

18. The optical disk according to claim 17, wherein said third reflective film has a color differing from the colors of said first and second reflective films.

19. A fabrication method of an optical disk including a transparent substrate having a data recording region in which data is recorded at an inner circumference thereof, said fabrication method of an optical disk comprising the steps of:

- attaching a mask on a region excluding the data recording region of said transparent substrate and excluding a region located at an outer circumferential side of said data recording region and forming a pattern,
- forming a reflective film on the transparent substrate where said mask is attached,
- removing said mask from said transparent substrate,
- forming a transparent protection film on said reflective film, and
- forming a label on said transparent protection film,
- wherein an outer circumferential side edge of said label is located inner than an outer circumferential side edge of said reflective film.

\* \* \* \* \*

UNITED STATES PATENT AND TRADEMARK OFFICE
CERTIFICATE OF CORRECTION

PATENT NO.   : 6,735,166 B1
DATED        : May 11, 2004
INVENTOR(S)  : Takanari Kusafuka et al.

It is certified that error appears in the above-identified patent and that said Letters Patent is hereby corrected as shown below:

<u>Title page,</u>
Item [30], Foreign Application Priority Data, please add
-- Japan  2000-247366  August 17, 2000 --.

Signed and Sealed this

Seventh Day of September, 2004

JON W. DUDAS
*Director of the United States Patent and Trademark Office*